United States Patent [19]
Hitzelberger

[11] 3,878,676
[45] Apr. 22, 1975

[54] FUEL METERING

[75] Inventor: Alan L. Hitzelberger, Grand Blanc, Mich.

[73] Assignee: General Motors Corporation, Detroit, Mich.

[22] Filed: Sept. 17, 1973

[21] Appl. No.: 397,763

[52] U.S. Cl. ......................................... 60/39.28 R
[51] Int. Cl. ............................................. F02c 9/10
[58] Field of Search ........ 60/39.28 R; 137/108, 116, 137/117

[56] References Cited
UNITED STATES PATENTS

| | | | |
|---|---|---|---|
| 3,390,522 | 7/1968 | Whitehead | 60/39.28 R |
| 3,434,395 | 3/1969 | Londal | 60/39.28 R |
| 3,438,199 | 4/1969 | McGinnis | 60/39.28 R |
| 3,469,397 | 9/1969 | Parker | 60/39.28 R |
| 3,531,936 | 10/1970 | Widell | 60/39.28 R |
| 3,600,889 | 8/1971 | Ifield | 60/39.28 R |
| 3,611,721 | 10/1971 | Ifield | 60/39.28 R |

*Primary Examiner*—Clarence R. Gordon
*Attorney, Agent, or Firm*—Paul Fitzpatrick

[57] ABSTRACT

A fuel supply system for a gas turbine engine such as a gas-coupled vehicle driving engine includes a pump driven by the engine, a resistance valve between the pump outlet and the engine combustion chamber fuel nozzle, and a by-pass from the pump outlet to the pump inlet flowing through a by-pass valve and a resistance valve in series. The fuel nozzle provides a fuel metering orifice. The by-pass valve is biased to open by fuel pump discharge pressure and is biased to close by a pressure derived from the engine compressor discharge pressure. Compressor discharge pressure is fed through an orifice into a chamber to bias a diaphragm which operates to close the valve. Compensation for ambient temperature and pressure are provided by suitably controlled bleeds from this chamber. Limitation of metered fuel pressure for acceleration is accomplished by the compressor discharge pressure as so modified, and steady state fuel pressure is limited by a relief valve from the chamber the pressure setting of which is varied by manual control. The resistance valve in the engine fuel line establishes a suitable bias tending to open the by-pass valve to accommodate its characteristics to those of the engine, and a resistance valve in the by-pass line which has a higher setting enforces flow of fuel to the engine during starting.

10 Claims, 2 Drawing Figures

PATENTED APR 22 1975 3,878,676

FUEL METERING

My invention is directed to fuel systems and particularly to a relatively simple and inexpensive fuel system for a gas turbine engine such as may be employed for such service as propelling motor vehicles, for example. Such engines ordinarily include a compressor supplying air to a combustion apparatus in which fuel is burned to supply motive fluid to a turbine which drives the compressor. This apparatus is called a gas generator. The engine also ordinarily includes a second turbine energized by the exhaust from the gas generator which provides power output to the vehicle wheels through a suitable transmission. The engine also may include a regenerator, but this is immaterial to the present invention.

My invention is concerned primarily with the provision of a simple and inexpensive but adequate fuel control for such purposes which will provide for control of the power output of the engine and prevent the gas generator from reaching damaging levels of speed and temperature. The control is of such nature as to provide for elimination of elements frequently included in gas turbine controls such as tachometers and thermocouples, which add to the cost and complexity of conventional turbine fuel controls.

In brief summary, in its preferred embodiment, my fuel control includes a pump preferably driven by the gas generator which is capable of supplying fuel in excess of engine requirements in all regimes of engine operation and a fixed orifice, ordinarily in the fuel spray nozzle, through which fuel flows into the engine combustion apparatus. It includes a by-pass valve which returns excess pump discharge to the pump inlet and thereby regulates flow to the engine. The by-pass valve is controlled primarily by balancing fuel pressure against a control pressure derived from compressor discharge pressure. Fuel pressure acts to open the by-pass valve and the control pressure acts to close it. In this context, compressor discharge pressure and combustion chamber air pressure are essentially the same (or at least closely related) and may be regarded as interchangeable in practical application. Air flowing from the compressor into the burner loses some, but not much, pressure even if a regenerator is provided in the engine. The difference may be accommodated in calibration of the fuel control. This balancing of pressure, with a fixed area fuel nozzle, results in a suitable limit of fuel-air ratio in the combustion chamber for acceleration of the engine. For steady state operation, fuel is further limited by bleeding off air to reduce the control pressure and thereby reduce fuel pressure and flow to the engine.

For many applications, it is also desirable to adjust the control pressure in accordance with ambient conditions of temperature and pressure. This may be accomplished by suitably controlled bleeding of the control pressure. To provide a fully satisfactory fit between the fuel pressure and combustion chamber air pressure for acceleration, the by-pass valve is biased open by a force generated by the resistance valve in the fuel discharge line to the engine which maintains a minimum small pressure differential at the fuel pump outlet above engine fuel pressure. To provide a desired amount of fuel for starting, a resistance valve in the by-pass line set to a slightly higher pressure than the resistance valve in the metered fuel line causes fuel to flow at a low rate to the combustion apparatus prior to effective operation of the by-pass valve.

The principal objects of my invention are to provide a simple, reliable, and inexpensive control for a gas turbine engine for service such as motor vehicles and the like. A further object is to provide a gas turbine fuel control based primarily upon by-passing fuel in response to the relation between fuel pressure and compressor discharge pressure. A further object is to provide a simplified arrangement for supplying fuel at a low rate for engine starting.

The nature of my invention and its advantages will be clear to those skilled in the art from the succeeding detailed description of the presently preferred embodiment of the invention and the accompanying drawings thereof.

Figure 1:
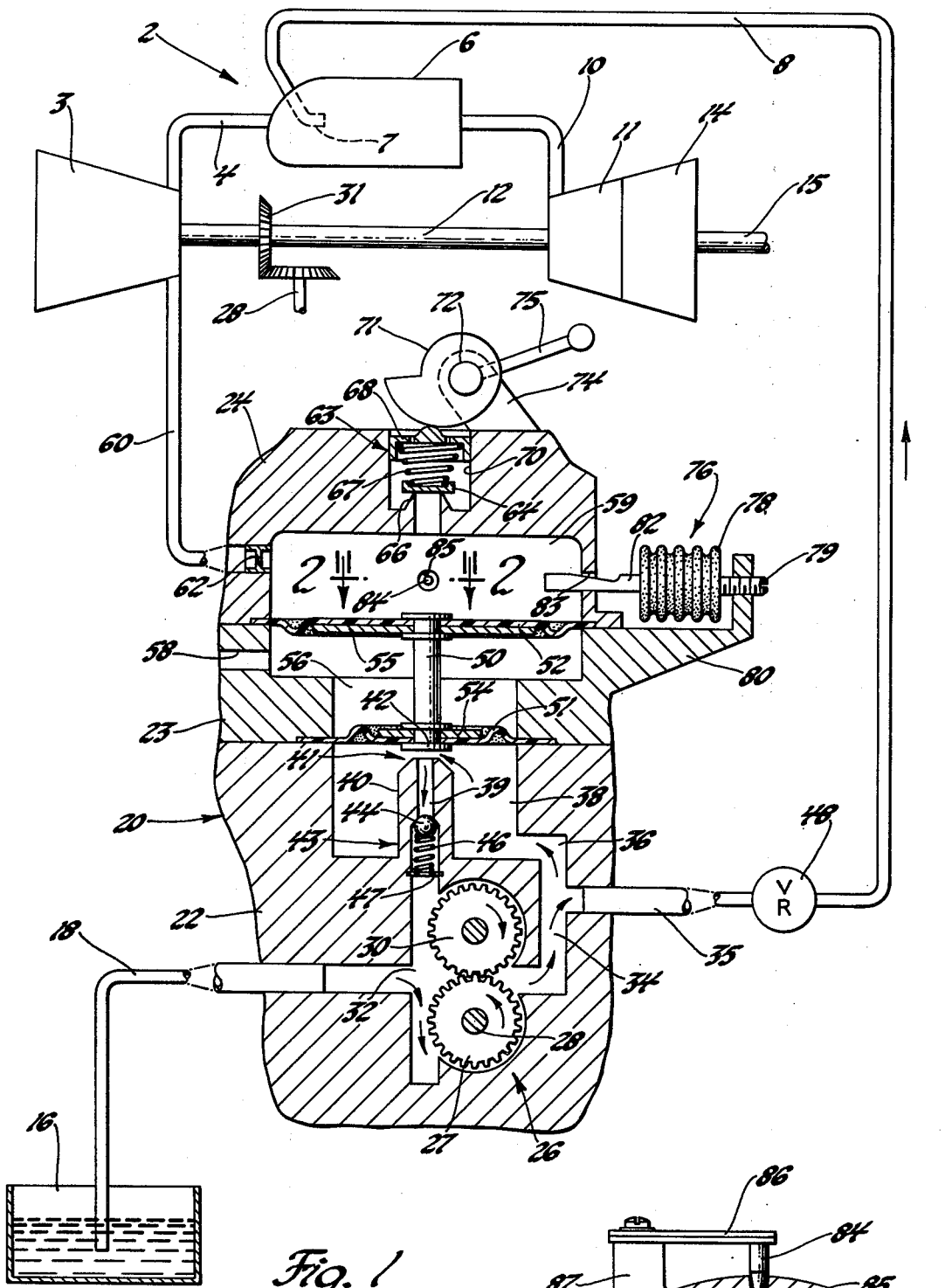
FIG. 1 is a schematic diagram of a gas turbine fuel system embodying the invention.

Referring to FIG. 1, a gas turbine engine 2 comprises a compressor 3 which takes in ambient air and delivers it at increased pressure through a duct 4 to a combustion apparatus 6. Fuel is sprayed within the combustion apparatus, which may be termed a burner hereinafter for conciseness, by a fuel nozzle 7 supplied with fuel under pressure through a metered fuel line 8. The fuel nozzle may be of the type having a fixed swirl port or ports defining a constant flow area for the fuel. The fuel is ignited by suitable means (not illustrated) and the resulting combustion products flow through a duct 10 to the high pressure turbine 11 which drives the compressor 3 through a shaft 12. This part of the apparatus is termed a gas generator. It delivers partially expanded hot gas to a power turbine 14 which drives the power output shaft 15. Shaft 15 may be connected through a suitable transmission to the driving wheels of a vehicle or be otherwise connected to a load.

Fuel for the engine is taken from a tank 16 through a low pressure fuel line 18 to a fuel supply assembly 20 illustrated somewhat schematically. The fuel supply assembly may have three body portions, a pump body 22, an intermediate body portion 23, and a cover 24, suitably fixed together by means not illustrated. The pump body 22 encloses a fuel pump preferably of a positive displacement type such as the gear pump 26 illustrated, which includes a driving gear 27 on a shaft 28 and a driven gear 30. The shaft 28 may be driven through suitable gearing 31 from the gas generator shaft 12 or otherwise.

Fuel enters the pump 26 through an inlet 32 and is delivered through a pump discharge line 34 which branches into a metered fuel outlet 35 and a by-pass line initial portion 36. The latter leads into a cylindrical chamber 38 which contains fuel at pump discharge pressure. The outlet of this chamber is through a continuing by-pass line 39 the entrance to which provides a seat 40 for a poppet 42 reciprocable into engagement with the seat. Poppet 42 and seat 40 constitute a by-pass valve 41. The by-pass line or conduit continues through a resistance valve 43 to the pump inlet 32. The resistance valve 43 is of conventional type comprising a ball 44 biased against an annular seat by a light compression spring 46 reacting against an abutment defined by an expanding snap ring 47.

The metered fuel outlet 35 is connected through a resistance valve 48 and the metered fuel line 8 to the burner fuel nozzle 7. The resistance valve 48 provides a small pressure drop slightly less than that of the resistance valve 43 for a reason to be explained. It acts also as an anti-dribble valve and as a nonreturn valve to prevent fuel or air from flowing backward through line 8 into the fuel metering assembly. Resistance valve 48 may be similar in structure to resistance valve 43.

Before proceeding to details of the mechanism for operating the by-pass valve 41, we may reassert the fact that the amount of fuel flowing to the engine is determined by the amount which is allowed to by-pass or return to the pump inlet through this valve. The by-pass valve acts to control the pressure at the pump outlet by by-passing whatever amount of fuel is necessary to maintain the desired pressure in the pump outlet. Outlet pressure is determined or limited by compressor discharge pressure or by a manual setting to reduce it below that which would be determined by compressor discharge pressure.

My control is intended for an engine of a gas-coupled type in which there is a freely rotating gas generator. In an engine of this type having a fuel nozzle with fixed ports which acts as a throttling means for fuel flow to the engine certain relations exist. One is that fuel flow is proportional to the square root of the pressure difference between the pressure of fuel supplied to the fuel nozzle and the pressure in the combustion chamber against which it discharges. Thus, if the fuel pressure is maintained at any given predetermined level above combustion chamber pressure, fuel will flow at a certain known rate for any specific orifice. Another relation is that compressor discharge pressure and combustion chamber pressure increase generally parabolically with the rotational speed of the gas generator. A further relation is that the fuel pressure differential required to deliver the maximum acceptable amount of fuel to the engine also increases generally parabolically with engine speed. Limits to this fuel are set by engine characteristics such as maximum turbine inlet temperature and the possibility of compressor surge. It can be shown that approximately the optimum fuel limit for acceleration may be followed by maintaining a constant ratio between fuel pressure and air pressure in the combustion apparatus, both measured as gauge pressure.

More particularly, in connection with an engine of this type, the fit of the actual fuel pressure curve to the fuel pressure allowable curve is improved by having a small fixed decrement in fuel pressure from that which would result from the ratio described above. Thus, for standard atmospheric conditions, my fuel control limits the fuel pressure delivered to the engine to a constant fraction of combustion chamber pressure minus a small fixed pressure difference to cause better fitting of the curve. The fuel supplied for acceleration is thus controlled to provide for rapid acceleration of the gas generator without exceeding limits of temperature or other parameters.

For steady state running, fuel pressure may be reduced at will be reducing the effective force exerted by burner pressure tending to increase fuel flow. It may also be corrected for ambient conditions of atmospheric pressure and temperature which must be taken into account for most accurate limitation of fuel flow during acceleration.

With this background in mind, we may point out that valve poppet 44 is at one end of a stem 50 which is connected to a fuel pressure responsive diaphragm 51 and to an air pressure responsive diaphragm 52. The fuel pressure diaphragm is impinged between the sections 22 and 23 of the assembly 20 and is a flexible diaphragm backed up by a rigid disk 54 in accordance with common practice. The air pressure diaphragm 52 is impinged between the sections 23 and 24 of the assembly and is backed up by a rigid disk 55. As is well known, the effective area of such a diaphragm is intermediate between the area of the diaphragm and that of the rigid disk, and is subject to calculation. In the case of the particular engine referred to here, a ratio of 2½ to 1 in effective areas of the diaphragms has been found to provide the right balance between fuel pressure and air pressure. This takes into consideration some attention of the control air pressure by means to compensate for varying ambient conditions, as will be described. The chamber 38 below diaphragm 51 as illustrated is filled with fuel at pump discharge pressure and the space 56 between the diaphragms is open to ambient atmospheric pressure through a port 58. The chamber 59 above the air pressure responsive diaphragm is filled with air delivered from the compressor and maintained at a pressure which will be called the control pressure.

Thus, the force exerted to close the by-pass valve is proportional to the effective area of diaphragm 52 times the gauge value of control pressure and the force effective to open the by-pass valve is equal to the effective area of diaphragm 51 times the gauge value of fuel pressure. Fuel pressure is higher than the pressure of fuel supplied to the engine by the drop in resistance valve 48. In this particular installation, to provide the best matching between the air pressure and fuel pressure, a biasing force of 3 lbs. tending to open the by-pass valve is needed. With the effective area of diaphragm 51 selected to be one square inch, the resistance valve 48 is calibrated to provide a 3 lb. per square inch pressure drop, thus biasing the by-pass valve 41 to open by a force of 3 lbs. in addition to the forces exerted by the air and the pressure which would be exerted by the fuel as delivered to the engine.

The control pressure in chamber 59 is derived from the compressor outlet or burner inlet through a line 60 which enters the chamber 59 through a small orifice or restriction 62. The pressure in chamber 59 is equal to burner pressure less any pressure drop through the restriction resulting from flow out of chamber 59. This reduction of control pressure below burner pressure provides for limiting fuel to the engine for steady state operation or deceleration and also for modifying fuel in accordance with ambient conditions.

Considering first the limitation of fuel to effect desired speed of the engine at steady state operation, this is accomplished by a pressure relief valve 63 including a poppet 64 engageable with an annular seat 66 terminating an outlet from the chamber 59. The poppet is biased against the seat by a compression spring 67 reacting against an abutment 68 reciprocably mounted in a bore 70 in the body. The abutment is perforated to permit air to escape from the cylinder. Its position is determined by a generally spiral cam 71 fixed on a shaft 72 mounted in a bracket 74 extending from the body portion 24. The cam is settable by an arm or lever 75 fixed to shaft 72. This may be considered to be a throttle lever or any linkage which may connect the cam 71 to a foot throttle pedal of the vehicle, for instance. Depending upon the position of the cam and thus the setting of relief valve 63, the gauge pressure in chamber 59 is limited to the relief valve setting; and therefore the pressure in chamber 38 is limited to 2½ times this setting and fuel pressure of the engine is held at 3 lbs. less than this. Of course, these values are suitable to one engine. They may be varied to suit other engines. Maximum fuel flow under any conditions is limited by the maximum setting of relief valve 63, which again is calibrated to the requirements of the particular engine.

In most applications of such an engine, it is also desirable to reduce fuel flow as atmospheric temperature or atmospheric pressure decreases. To modify the acceleration fuel schedule in accordance with ambient conditions, it is necessary only to vary the fuel flow from that at standard atmospheric conditions in proportion to the ratio of actual absolute atmospheric pressure to standard atmospheric pressure and in proportion to the square root of the ratio of actual absolute ambient temperature to standard absolute ambient temperature. These variations may be accomplished simply by the structure illustrated.

The ambient pressure compensator 76 comprises an elastic evacuated bellows 78 which contracts as atmospheric pressure increases and which is adjustably mounted by a threaded stem 79 in a bracket 80 extending from the assembly 20. The free end of the bellows is fixed to a contoured metering rod 82 slidable in a calibrated hole 83 from the chamber 59 to atmosphere. As atmospheric pressure increases, the metering rod is drawn outward by compression of the bellows further throttling this leak from the chamber. The decreasing flow through orifice 62 raises the pressure within chamber 59, thereby increasing fuel pressure.

Figure 2:
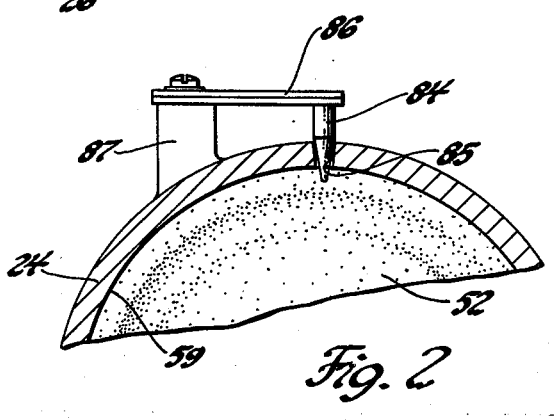
FIG. 2 is a sectional view taken on the plane indicated by the line 2—2 in FIG. 1 illustrating an ambient temperature compensating device.

For ambient temperature compensation, a contoured needle valve member 84 (see also FIG. 2) is reciprocable in a calibrated opening 85 in the wall of chamber 59 leading to atmosphere. This needle is fixed to a thermally responsive bimetal strip 86 fixed to a post 87 extending from the housing 24. As temperature increases, the needle is moved further into the hole, decreasing the leakage of control pressure and thereby increasing the pressure in chamber 59 and the pressure of fuel supplied to the engine. The needle is suitably contoured in accordance with the relation stated above. It will be noted that these corrections are additive rather than multiplicative, but they are sufficiently accurate for practical purposes over a reasonable range of variations of temperature and pressure such as might be expected in operation of a motor vehicle.

The bias on the by-pass valve member 44 might be accomplished simply by a spring pressing the member away from its seat. However, the resistance valve 48 is desirable as a means to prevent dribbling of fuel and as a check valve to prevent return flow; and by calibrating it to serve the function of providing the by-pass valve bias it performs this additional useful function in addition to those of the usual resistance valve between a fuel control and burner.

Ordinarily, in starting the engine it is not feasible to meter fuel as a function of compressor discharge pressure until after the engine enters an idling speed range. Compressor pressure rise is very small at engine cranking speed and is not relied upon to meter fuel for ignition of the engine. This function is accomplished by resistance valves 43 and 48. In this particular example, resistance valve 43 is set to open at 5 psi pressure which is 2 lbs. above valve 48. As a result, as the engine is being cranked and the pump 27 is turning over, the by-pass is held closed by resistance valve 44 until the pressure is high enough to provide an effective pressure of 2 psig in metered fuel line 8. In the particular case, it provides a flow of approximately 25 lbs. of fuel per hour. In this particular example, when the control pressure reaches 2 psig which is 40% of the fuel pressure on diaphragm 51, valve 41 will begin to close and the diaphragm system will take control of by-pass fuel and metered fuel to follow the acceleration schedule for further acceleration of the engine.

It should be pointed out that the metering function of fuel nozzle 7 may be accomplished by an orifice in fuel line 8 if the fuel is atomized by means not including a fixed orifice. The operation of the control should be clear from the foregoing, but it may be desirable to outline it. Assuming that the engine is to be started, the control 75 will be set to cause the gas generator to stabilize at an idling speed, the engine starter is energized, the igniter is turned on, and the engine begins to accelerate. When the output pressure of the fuel pump reaches 3 psig, flow can proceed through resistance valve 48 to the burner. The amount of fuel so flowing is limited by resistance valve 43 which limits pressure in the pump outlet to 5 psig. When the control pressure in chamber 59, which is proportional to burner air pressure, reaches 2 psig in the illustrated example the by-pass valve 41 begins to close and fuel pressure is raised by the resistance to flow through this valve. The engine continues to accelerate, with the ratio of fuel to air maintained by the balance between air pressure and fuel pressure established as described above. When the engine reaches the desired idling speed the control pressure is sufficient to open relief valve 63 and provide a constant limit to fuel pressure and therefore control engine operation at the desired level. For acceleration, the setting of the relief valve is increased, and the engine accelerates along its characteristic line until the control pressure again reaches the relief valve setting. For deceleration, the setting of relief valve 60 is decreased, which bleeds control pressure down, allowing a greater by-pass of fuel until the pressure balance is restored. The effect of the ambient pressure and temperature responsive devices is simply to vary the ratio between the control pressure and burner air pressure. The ratio of areas of the diaphragms is selected to fit the desired ratio of fuel pressure to burner pressure under standard conditions and the increase or decrease in bleeds through these ambient condition compensating devices merely changes the ratio of the control pressure to burner pressure, thereby increasing or decreasing the fuel-air ratio to accord with the effect of ambient conditions on engine operation.

It will be seen that my control operates to meter fuel to the engine as a function of the pressure in the engine limited by a maximum pressure setting, compensated for ambient conditions where such compensation is needed. It is a very simple control and does not require inputs of engine speed or temperature. The corrections for ambient temperature and pressure condition are the result of simple devices built into the fuel control. The whole structure may be quite compact. In a typical installation, the effective area of the larger diaphragm is 2½ square inches. It will be seen that the mechanisms employed are of a relatively inexpensive and simple type.

The detailed description of the preferred embodiment of the invention for the purpose of explaining the principles thereof is not to be considered as limiting or restricting the invention, since many modifications may be made by the exercise of skill in the art.

I claim:

1. A fuel control system adapted to receive fuel under pressure from a source adapted to supply an excess of fuel and to deliver a metered amount of the fuel to a gas turbine engine combustion apparatus through fixed orifice means comprising, in combination, a metered fuel line for connection to the fixed orifice means; a resistance valve in the metered fuel line; a by-pass conduit for diverting fuel from the metered fuel line upstream of the resistance valve; a by-pass valve in the conduit; means responsive to fuel source gauge pressure and to a control gauge pressure related to combustion apparatus air pressure effective to operate the by-pass valve to meter engine fuel flow for acceleration; and operator-controllable means effective to variably limit the control pressure to operate the by-pass valve to meter engine fuel flow for steady-state operation; the resistance valve establishing a substantially fixed fuel pressure differential between metered fuel pressure and fuel source pressure biasing the by-pass valve to open.

2. A system as recited in claim 1 including also means for modulating the control pressure in the said chamber as a function of ambient atmospheric pressure.

3. A system as recited in claim 1 including also means for modulating the control pressure in the said chamber as a function of ambient atmospheric temperature.

4. A fuel control system adapted to receive fuel under pressure from a source adapted to supply an excess of fuel and to deliver a metered amount of the fuel to a gas turbine engine combustion apparatus through fixed orifice means comprising, in combination, a metered fuel line for connection to the fixed orifice means; a first resistance valve in the metered fuel line; a by-pass conduit for diverting fuel from the metered fuel line upstream of the first resistance valve; a by-pass valve in the conduit; a second resistance valve in the by-pass conduit downstream of the by-pass valve; means responsive to fuel source gauge pressure and to a control pressure related to combustion apparatus air gauge pressure effective to operate the by-pass valve to meter engine fuel flow for acceleration; and operator-controllable means effective to variably limit the control pressure to operate the by-pass valve to meter engine fuel flow for steady-state operation; the first resistance valve establishing a substantially fixed fuel pressure differential between metered fuel pressure and fuel source pressure biasing the by-pass valve to open; and the second resistance valve establishing a minimum pressure drop in the by-pass conduit greater than the pressure differential of the first resistance valve to cause fuel to flow for starting the engine irrespective of an open condition of the by-pass valve.

5. A fuel control system adapted to receive fuel under pressure from a source adapted to supply an excess of fuel and to deliver a metered amount of the fuel to a gas turbine engine combustion apparatus through fixed orifice means comprising, in combination, a metered fuel line for connection to the fixed orifice means; a first resistance valve in the metered fuel line; a by-pass conduit for diverting fuel from the metered fuel line upstream of the first resistance valve; a by-pass valve in the conduit; a second resistance valve in the by-pass conduit downstream of the by-pass valve; and means responsive to fuel source gauge pressure and to a control pressure related to combustion apparatus air gauge pressure effective to operate the by-pass valve to meter engine fuel flow for acceleration; the second resistance valve establishing a minimum pressure drop in the by-pass conduit greater than the pressure differential of the first resistance valve to cause fuel to flow for starting the engine irrespective of an open condition of the by-pass valve.

6. A fuel control system adapted to receive fuel under pressure from a source adapted to supply an excess of fuel and to deliver a metered amount of the fuel to a gas turbine engine combustion apparatus through fixed orifice means comprising, in combination, a metered fuel line for connection to the fixed orifice means; a resistance valve in the metered fuel line; a by-pass conduit for diverting fuel from the metered fuel line upstream of the resistance valve; a by-pass valve in the conduit; a first movable wall connected upstream of the valves responsive to fuel source gauge pressure operative to bias the by-pass valve to open; a second movable wall of greater effective area than the first movable wall responsive to gauge value of a control pressure exerted against the wall operative to bias the by-pass valve to close; means including the second movable wall defining a chamber containing fluid at the control pressure; means including a flow restriction connecting the chamber to a source of fluid under pressure closely related to combustion apparatus air pressure; a relief valve effective to limit pressure in the chamber; and means for variably setting the relief valve to limit fuel flow to the combustion apparatus; the resistance valve establishing a substantially fixed fuel pressure differential between metered fuel pressure and fuel source pressure biasing the by-pass valve to open.

7. A system as recited in claim 6 including also means for modulating the control pressure in the said chamber as a function of ambient atmospheric pressure.

8. A system as recited in claim 6 including also means for modulating the control pressure in the said chamber as a function of ambient atmospheric temperature.

9. A fuel control system adapted to receive fuel under pressure from a source adapted to supply an excess of fuel and to deliver a metered amount of the fuel to a gas turbine engine combustion apparatus through fixed orifice means comprising, in combination, a metered fuel line for connection to the fixed orifice means; a first resistance valve in the metered fuel line; a by-pass conduit for diverting fuel from the metered fuel line upstream of the first resistance valve; a by-pass valve in the conduit; a second resistance valve in the by-pass conduit downstream of the by-pass valve; a first movable wall connected upstream of the valves responsive to fuel source gauge pressure operative to bias the by-pass valve to open; a second movable wall of greater effective area than the first movable wall responsive to gauge value of a control pressure exerted against the wall operative to bias the by-pass valve to close; means including the second movable wall defining a chamber containing fluid at the control pressure; means including a flow restriction connecting the chamber to a source of fluid under pressure closely related to combustion apparatus air pressure; a relief valve effective to limit pressure in the chamber; and means for variably setting the relief valve to limit fuel flow to the combustion apparatus; the first resistance valve establishing a substantially fixed fuel pressure differential between metered fuel pressure and fuel source pressure biasing the by-pass valve to open; and the second resistance valve establishing a minimum pressure drop in the by-pass conduit greater than the pressure differential of the first resistance valve to cause fuel to flow for starting the engine irrespective of an open condition of the by-pass valve.

10. A fuel control system adapted to receive fuel under pressure from a source adapted to supply an excess of fuel and to deliver a metered amount of the fuel to a gas turbine engine combustion apparatus through fixed orifice means comprising, in combination, a metered fuel line for connection to the fixed orifice means; a first resistance valve in the metered fuel line; a by-pass conduit for diverting fuel from the metered fuel line upstream of the first resistance valve; a by-pass valve in the conduit; a second resistance valve in the by-pass conduit downstream of the by-pass valve; a first movable wall connected upstream of the valves responsive to fuel source gauge pressure operative to bias the by-pass valve to open; a second movable wall of greater effective area than the first movable wall responsive to gauge value of a control pressure exerted against the wall operative to bias the by-pass valve to close; means including the second movable wall defining a chamber containing fluid at the control pressure; means including a flow restriction connecting the chamber to a source of fluid under pressure closely related to combustion apparatus air pressure; a relief valve effective to limit pressure in the chamber; means for variably setting the relief valve to limit fuel flow to the combustion apparatus, the first resistance valve establishing a substantially fixed fuel pressure differential between metered fuel pressure and fuel source pressure biasing the by-pass valve to open; and the second resistance valve establishing a minimum pressure drop in the by-pass conduit greater than the pressure differential of the first resistance valve to cause fuel to flow for starting the engine irrespective of an open condition of the by-pass valve; means for modulating the control pressure in the said chamber as a function of ambient atmospheric pressure; and means for modulating the control pressure in the said chamber as a function of ambient atmospheric temperature.

* * * * *

UNITED STATES PATENT AND TRADEMARK OFFICE
CERTIFICATE OF CORRECTION

PATENT NO. : 3,878,676
DATED : April 22, 1975
INVENTOR(S) : Alan L. Hitzelberger It is certified that error appears in the above--identified patent and that said Letters Patent are hereby corrected as shown below:

Column 3, line 62, "be" should read -- by --.

Column 7, line 19, after "control", delete "gauge".

Column 7, line 20, after "air" insert -- gauge --.

Signed and Sealed this second Day of September 1975

[SEAL]

Attest:

RUTH C. MASON
Attesting Officer

C. MARSHALL DANN
Commissioner of Patents and Trademarks